Nov. 18, 1958     M. E. GRES ET AL     2,860,662
QUICK ACTING, ACCURATE SENSING, VARIABLE
SETTING POPPET VALVE

Filed Sept. 21, 1955     2 Sheets-Sheet 1

INVENTORS
MARCEL E. GRES
EDWIN H. BLOCK

BY

ATTORNEYS

Nov. 18, 1958
M. E. GRES ET AL
2,860,662
QUICK ACTING, ACCURATE SENSING, VARIABLE
SETTING POPPET VALVE
Filed Sept. 21, 1955
2 Sheets-Sheet 2
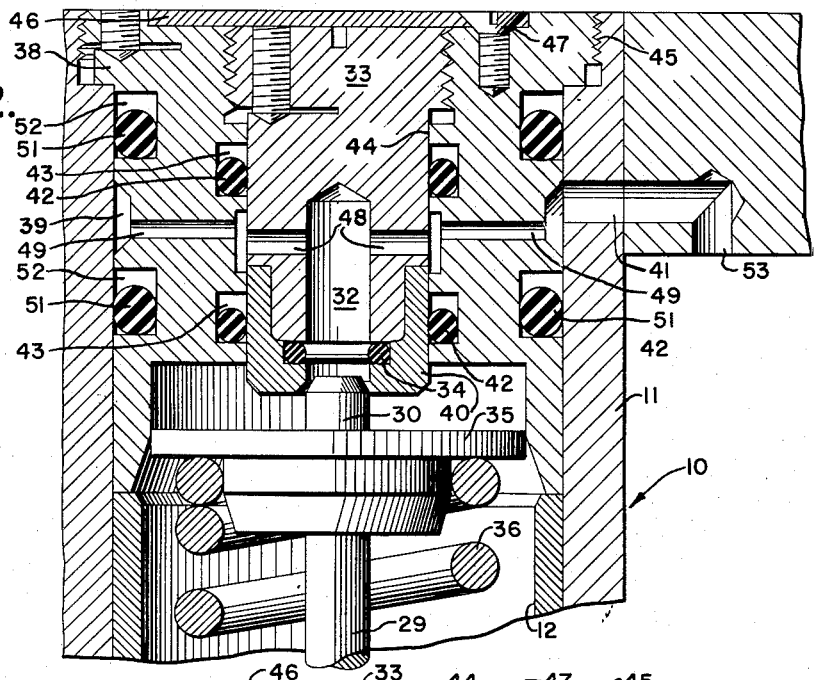
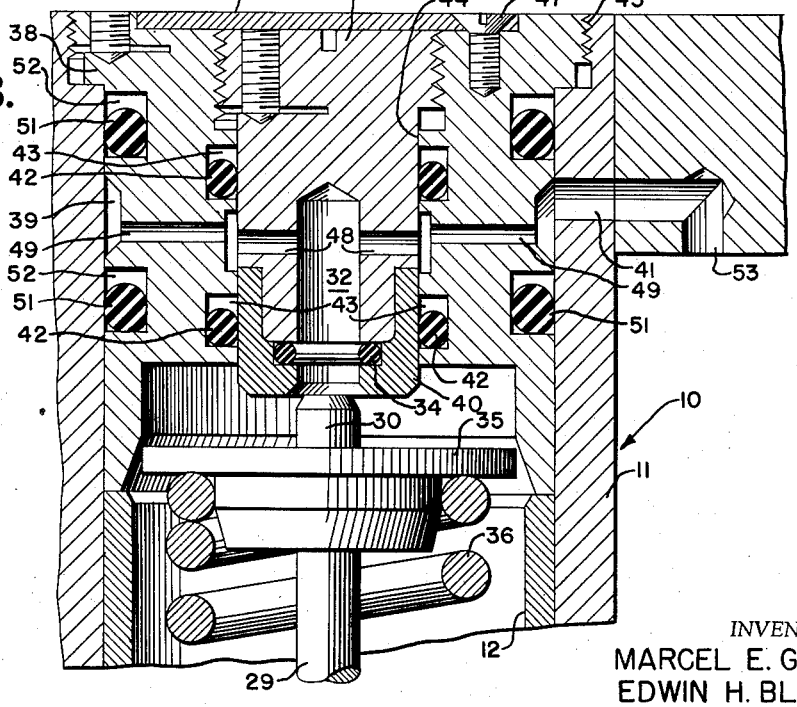
INVENTORS
MARCEL E. GRES
EDWIN H. BLOCK
BY
ATTORNEYS

United States Patent Office 2,860,662
Patented Nov. 18, 1958

2,860,662

QUICK ACTING, ACCURATE SENSING, VARIABLE SETTING POPPET VALVE

Marcel E. Gres and Edwin H. Block, Austin, Tex., assignors, by mesne assignments, to the United States of America as represented by the Secretary of the Navy Application September 21, 1955, Serial No. 535,771

7 Claims. (Cl. 137—469)

The present invention relates to a depth charge pistol and more particularly to a new and improved quick acting, accurate sensing and variable setting poppet valve.

Moreover, the invention provides a valve structure which is substantially friction free, extremely accurate within its operating range and which is admirably suited for use as a pressure release device, pressure controlled signaling device and for porting fluid pressure to a control system.

Furthermore, the valve structure is particularly adapted for use with a rocket propelled depth charge such, for example, as the type disclosed and claimed in the copending application of Marcel E. Gres, Serial No. 409,548, filed February 10, 1954, title, Depth Charge Pistol, and in which means are employed for preselecting the depth of the firing of the depth charge by setting an indexing mechanism immediately prior to launching, the indexing mechanism being operated by remote control from a selector station. Moreover, the poppet valve is constructed and arranged to actuate a hydrostatic switch when the depth charge reaches a predetermined depth of submersion thereby to render the firing circuit effective to explode the depth charge. The valve is operatively connected to the indexing mechanism and impeller means of the depth charge and controlled thereby whereupon the valve may be set to open in response to a predetermined pressure applied thereto.

The valve consists essentially of a rotatable element in threaded engagement with a spring compressing member for slidably moving the member within the valve casing thereby to compress the depth control spring disposed between the member and a large sensing element formed on the valve stem. The spring maintains a small sensing element on the stem in sealing engagement with an O ring and the large sensing element in engagement with the zero adjusting screw and the valve casing whereupon the valve is normally closed and sealed to the casing. As hydrostatic pressure enters the casing the small sensing element is unsealed from the O ring thereby exposing the large sensing element to the pressure and thus due to the increased pressure area exposed, the valve structure is quickly moved to an open position. The zero adjustment of the device is accomplished by adjusting the initial or zero compression of the spring by the zero adjusting element as the element is moved either in a clockwise or counterclockwise direction. Moreover, since the valve is in engagement with the adjusting element, the spring is compressed the desired amount of the zero reading.

An object of the present invention is to provide a new and improved poppet valve suitable for use in a depth charge pistol.

Another object of the invention is the provision of a quick acting pressure responsive device having means controlled by a movable element for causing the valve to operate in response to a variation in hydrostatic pressures applied thereto.

Still another object of the invention is the provision of a new and improved pressure release valve mechanism wherein a resilient element in a state of compression controls the opening of the valve in response to a predetermined hydrostatic pressure.

A still further object of the invention is the provision of a valve structure wherein novel means are employed to adjust and render the valve element effective to open selectively at different hydrostatic pressures.

Other objects and many of the attendant advantages of this invention will be readily appreciated as the same becomes better understood by reference to the following detailed description when considered in connection with the accompanying drawings wherein:

Fig. 2 is an enlarged fragmentary sectional view of the device with the valve element in a partially open condition; and Fig. 3 is a view similar to Fig. 2 with the valve element in a fully open condition.

Figure 1:
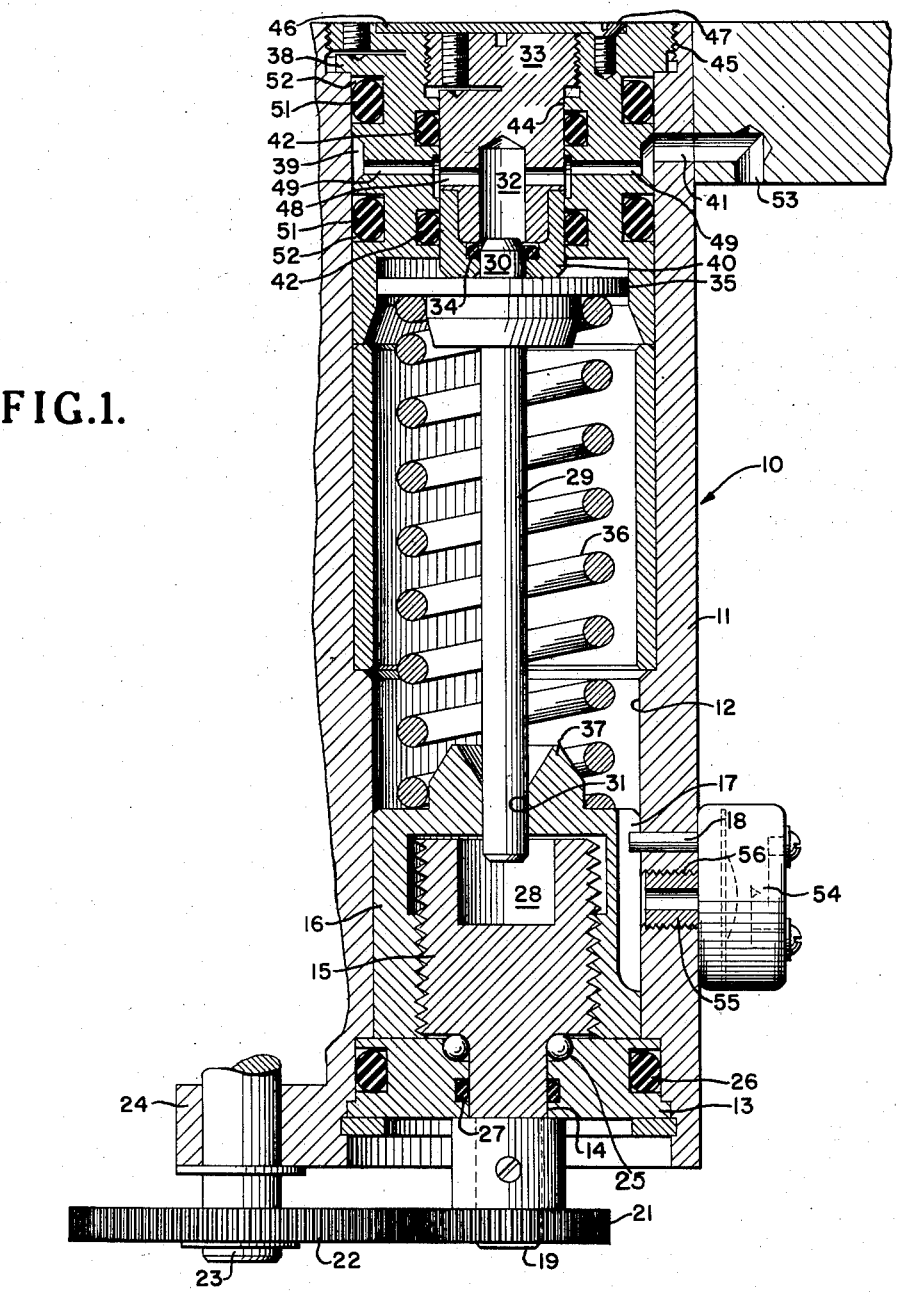
Fig. 1 is a central longitudinal sectional view of the valve constructed in accordance with the present invention, including means for driving the valve adjusting means.

Referring now to the drawings and more particularly to Fig. 1 thereof, the numeral 10 generally indicates the valve comprising a casing 11 having a centrally disposed bore 12 extending therethrough. A closure assembly 13 is disposed in the bore 12 at one end of the casing 11 and is provided with a bore 14 centrally arranged therein.

A feed screw 15 is arranged within the bore in threaded engagement with a cup-shaped spring support and compression device 16. The member 16 is provided with a keyway 17 having a key 18 slidably arranged within, the key being mounted on the casing 11.

The feed screw 15 has integrally formed therewith a shaft 19 extending through bore 14 in closure 13 and having a gear 21 fixed thereto meshing with a gear 22 fixed to a shaft 23 supported in a bearing 24 formed on the valve casing and adapted to be preferably connected to the indexing mechanism and driving means of the depth charge in the manner disclosed in the copending application of Marcel E. Gres, Serial No. 409,548, filed February 10, 1954, title, Depth Charge Pistol.

Shaft 19 is rotatively supported on ball bearings 25 arranged within bore 14 of the closure plate 13 and O rings 26 and 27 are disposed within grooves formed in closure plate 13 in sealing engagement with shaft 19 and bore 12, respectively. The screw element 15 is provided with a centrally disposed well 28 for receiving and permitting movement of valve stem 29 as the device is actuated to an open position. One end of the stem is slideably supported in a bore 31 formed in member 16, the other end thereof having a small sensing element 30 disposed in a bore 32 formed in a zero adjusting element generally indicated by the reference character 33 and normally sealed therein by an O ring 34, Fig. 1.

The valve stem 29 is further provided with an enlarged sensing disc or piston 35 in abutting engagement with the cup-shaped member 40 swivelly mounted on one end of member 33 and in normally sealed relation with the wall defining bore 12. A control spring 36 is disposed between the element 35 and the movable member 16, one end of the spring being in engagement with element 35, the other end thereof being in engagement with member 16 and disposed about a retaining boss 37 formed on member 16, Fig. 1.

The bore 12 is closed at the other end thereof by a closure 38 in threaded engagement with the casing 11 and having a circumferential groove 39 formed therein in communication with an opening 41 in casing 11. A pair of O rings 51 are arranged with one ring thereof on each side of the groove 39 in an annular groove 52 formed in closure in sealing engagement with the wall defining bore 12 to prevent leakage of fluid therebetween as more clearly shown on Figs. 2 and 3. The member 38 is provided with an axial bore 44 extending therethrough and threaded as at 45 for threaded engagement with the zero adjustment nut 33, the bore being closed by a plate 46 secured to the member 38 by screw or the like 47. It will be noted that the nut 33 is provided with a swiveled cup-shaped member 40 in abutting engagement with the disc or large sensing element 35. The zero adjustment is accomplished by adjusting the initial or zero compression of the spring 36 by rotating the zero adjusting element 33 in either a clockwise or counter clockwise direction, rotation of element 33 being facilitated by the swivel connection with member 40. Since the element 35 engages the outer surface of the member 40 of the zero adjusting element the spring is compressed to adjust the initial bias of the spring to the desired amount for the zero reading. The nut 33 is provided with a plurality of transverse bores 48 in communication with bore 44 and with corresponding bores 49 formed in closure element 38, the bores 49 being in communication with the annular groove 39. A pair of O rings 51 are disposed within grooves 52 respectively, formed in member 38 and arranged on opposite sides of the bores 49 in sealing engagement therewith and with the valve casing for providing a leakproof connection therebetween. The bore 41 in valve casing 11 communicates with a passage 53 for admitting hydrostatic pressure into the aforesaid bore and ports.

A hydraulic pressure switch 54, Fig. 1, is mounted on the valve casing 11, the switch comprising a nipple 55 in threaded engagement with a bore 56 formed in the valve casing 11 and communicating with the bore 12 therein. The switch 54 may be a conventional type hydrostatically operated switch adapted to be actuated to a closed position in response to a predetermined hydrostatic pressure thereby to render a depth charge firing circuit effective as the diaphragm therein is actuated by the pressure to close the switch contacts when the depth charge reaches a predetermined depth of submersion.

By the aforesaid arrangement the valve may be set to open at a desired hydrostatic pressure by rotating the feed screw 15, the screw being adapted to move the member 16 axially along the bore 12 whereupon the sensing spring 36 is compressed an amount corresponding to the desired pressure at which the valve will be actuated to an open position. The spring holds the large sensing element 35 in engagement with the outside surface of the member 40 of the zero adjusting element 33. When hydrostatic pressure enters bore 32 by way of ports 53, 41, 49 and 48, the pressure acts on the small sensing element 30 which is sealed in bore 32 by O ring 34. When the aforesaid pressure on the element 30 is increased just sufficiently to overcome the preselected or adjusted spring force, the sensing element 30 is unseated from the O ring 34, Fig. 2, exposing the large sensing element 35 to the pressure and thus due to the relatively large exposed pressure area of sensing element 35 the force acting on the valve against the spring 36 is increased sufficiently to quickly move the valve to an open position, Fig. 3. When this occurs the fluid pressure rushes by the sensing element 35 into bore 12 and actuates the hydrostatic switch 54. When the pressure within the bore 12 has risen to substantial equality with the surrounding hydrostatic pressure the valve is closed by spring 36.

From the foregoing it will be apparent that a new and improved hydrostatically operated poppet valve has been devised wherein means are employed for rendering the valve effective to open at a selected depth by hydrostatic pressure and which is substantially friction free and highly accurate within its operating range.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a hydraulically actuated valve mechanism for use in actuating a depth charge which is adjustable to render the depth charge effective at selected depths, in combination, a casing having a hermetically sealed chamber formed therein of different cross-sectional areas and having an inlet in communication with the surrounding fluid medium, valve means including a stem arranged to seal said inlet and forming a substantial seal with the casing portion of smaller cross-section and moveable into the casing portion of larger cross-section to open by forming with the latter portion a fluid passage, outlet means in communication with said latter portion so constructed as to effect rapid equalization of fluid pressure on opposite sides of the valve means upon opening of said valve means, a helical biasing spring for said valve, adjustable means threaded into said casing and settable at will to an adjusted position for compressing the spring just sufficiently to retain the valve in an initial closed position when the inlet is not connected to a source of pressure, and means including a shaft rotatably carried by the casing in sealed relation therewith for additionally compressing the spring sufficiently to apply a second bias thereto such that the valve is opened momentarily when the pressure applied to said inlet has increased to a predetermined value and closed by said spring when the pressure within the casing has increased to a value substantially equal to the pressure applied to said inlet.

2. In a hydraulically actuated valve mechanism for use in actuating a depth charge which is adjustable to render the depth charge effective at selected depths, in combination, a casing having a hermetically sealed chamber formed therein of different cross-sectional areas and having an inlet in communication with the surrounding fluid medium, valve means including a stem arranged to seal said inlet and forming a substantial seal with the casing portion of smaller cross-section and moveable into the casing portion of larger cross-section to open by forming with the latter portion a fluid passage, outlet means in communication with said latter portion so constructed as to effect rapid equalization of fluid pressure on opposite sides of the valve means upon opening of said valve means, a helical spring operatively connected to said valve means for biasing the valve means to a closed portion, means including a threaded plug having a recess formed therein in communication with said inlet for applying a first biasing force to said spring just sufficient to maintain the valve means closed when the inlet is exposed to the surrounding fluid medium, an O-ring carried by said plug and normally sealing one end of said stem to said recess when the valve means is closed, and means including a second threaded element and adjustable to a selected setting within which the other end of said stem is disposed for applying a second biasing force to said spring corresponding to a selected depth as the valve mechanism sinks within a body of water whereby the valve means is momentarily operated when the hydrostatic presure applied to said inlet has increased to a predetermined value corresponding to said setting and closed by said spring when the pressure within the casing has increased to a value substantially equal to said pressure applied to the inlet.

3. A mechanism according to claim 1 including means for locking the first named spring compressing means in a selected adjusted position.

4. A mechanism according to claim 2 including a pressure switch operatively connected to said casing in communication with said chamber and adapted to be operated by said hydrostatic pressure within the chamber as the valve is opened.

5. A mechanism according to claim 2 including a plurality of radial ducts in said plug and a complementary circular channel in said casing for maintaining continuous communication between said recess and the inlet regardless of the instant setting of the plug therein.

6. A mechanism according to claim 2 further characterized by a cup-shaped member swively carried by said plug and having a flat exterior surface in normal abutting relation with said valve and an aperture therein within which the first named end of said stem is disposed.

7. A mechanism according to claim 5 including a ball bearing device arranged between said second threaded element and said casing for facilitating movement of the second threaded element by reduction of friction therebetween as the result of an axial thrust by said spring.

References Cited in the file of this patent

UNITED STATES PATENTS

| | | |
|---|---|---|
| 979,811 | Wallam | Dec. 27, 1910 |
| 1,176,703 | Durham | Mar. 21, 1916 |
| 2,226,851 | Franck | Dec. 31, 1940 |
| 2,292,294 | Rotter | Aug. 4, 1942 |
| 2,419,815 | Breeze et al. | Apr. 29, 1947 |
| 2,479,359 | Holt | Aug. 16, 1949 |
| 2,591,528 | Filstrup | Apr. 1, 1952 |
| 2,597,961 | Steffen | May 27, 1952 |
| 2,670,172 | Moore et al. | Feb. 23, 1954 |